(12) United States Patent
Taveras

(10) Patent No.: US 9,004,426 B2
(45) Date of Patent: Apr. 14, 2015

(54) CONCEALABLE HOOK AND METHOD OF USE

(71) Applicant: Luis Manuel Taveras, Irvine, CA (US)

(72) Inventor: Luis Manuel Taveras, Irvine, CA (US)

( * ) Notice: Subject to any disclaimer, the term of this patent is extended or adjusted under 35 U.S.C. 154(b) by 0 days.

(21) Appl. No.: 13/830,294

(22) Filed: Mar. 14, 2013

(65) Prior Publication Data

US 2013/0277518 A1 Oct. 24, 2013

Related U.S. Application Data

(60) Provisional application No. 61/637,703, filed on Apr. 24, 2012.

(51) Int. Cl.
*A47F 5/08* (2006.01)
*F16M 13/02* (2006.01)
*A47G 1/20* (2006.01)

(52) U.S. Cl.
CPC . *F16M 13/02* (2013.01); *A47G 1/20* (2013.01)

(58) Field of Classification Search
USPC ............... 248/231.9, 305, 251, 249; 52/698; 211/90.03; 411/38, 36, 34, 37, 55, 51, 411/60.2
See application file for complete search history.

(56) References Cited

U.S. PATENT DOCUMENTS

| 1,452,514 | A | * | 4/1923 | Karitzky | 411/61 |
|---|---|---|---|---|---|
| 1,476,834 | A | * | 12/1923 | Pleister | 411/15 |
| 2,878,668 | A | * | 3/1959 | Starling et al. | 248/231.91 |
| 3,094,892 | A | * | 6/1963 | Topf | 411/42 |
| 4,408,938 | A | * | 10/1983 | Maguire | 411/71 |
| 4,633,640 | A | * | 1/1987 | Hutter | 52/704 |
| 4,634,326 | A | * | 1/1987 | Fischer | 411/54 |
| 4,708,552 | A | * | 11/1987 | Bustos et al. | 411/80.1 |
| 4,810,141 | A | * | 3/1989 | Rainville | 411/38 |
| 5,238,343 | A | * | 8/1993 | Scherrer | 411/55 |
| 5,246,323 | A | * | 9/1993 | Vernet et al. | 411/29 |
| 6,068,226 | A | * | 5/2000 | Anders | 248/231.91 |
| 6,086,035 | A | * | 7/2000 | Trifilio | 248/305 |
| 6,287,044 | B1 | * | 9/2001 | Huber | 403/297 |
| 6,712,573 | B1 | * | 3/2004 | Huber | 411/71 |
| 8,434,984 | B2 | * | 5/2013 | Toosky | 411/361 |
| 8,496,419 | B2 | * | 7/2013 | Frank | 411/34 |
| 8,526,192 | B2 | * | 9/2013 | Chen et al. | 361/758 |
| 8,572,874 | B2 | * | 11/2013 | Casterline | 40/757 |
| 8,628,049 | B2 | * | 1/2014 | Ghatikar | 248/201 |
| 2005/0123373 | A1 | * | 6/2005 | Hufnagl et al. | 411/43 |
| 2012/0091301 | A1 | * | 4/2012 | Braun | 248/231.91 |

* cited by examiner

*Primary Examiner* — Monica Millner
(74) *Attorney, Agent, or Firm* — Lapple IP Law, P.C.; Matthew C. Lapple

(57) ABSTRACT

A concealable hanging device for hanging seasonal decorations, pictures, coats or purses. The hanging device includes a sleeve having a proximal end, a distal end, an inside diameter and an outside diameter, and a pin having a proximal end with a head and a distal end with a tip. The pin is movably engaged in the sleeve and oriented such that the proximal end of the pin engages the proximal end of the sleeve and the distal end of the pin engages the distal end of the sleeve so that the moveably-engaged pin can be moved to an extended position and a retracted position within the sleeve but the tip configured such that the tip engages the sleeve to prevent the pin from being removable from the sleeve when the pin is moved to an extended position and the head engages the sleeve to allow the head to be grasped in order to allow the pin to be moved into the extended position.

3 Claims, 23 Drawing Sheets

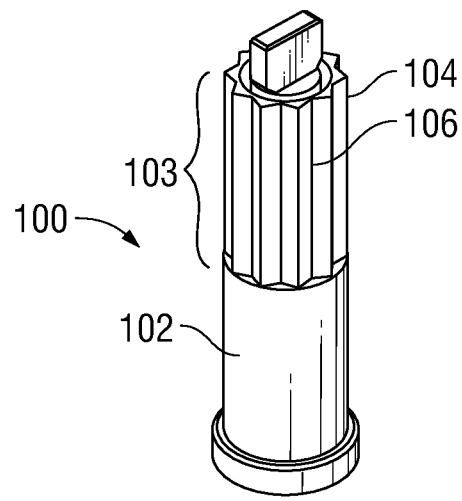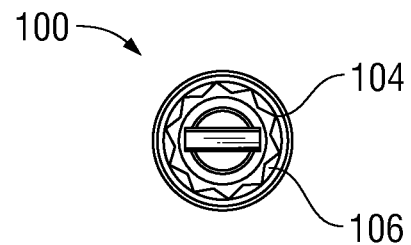
FIG. 2A  FIG. 2B
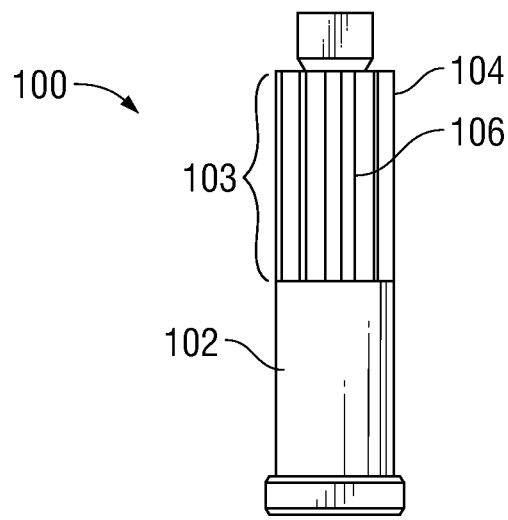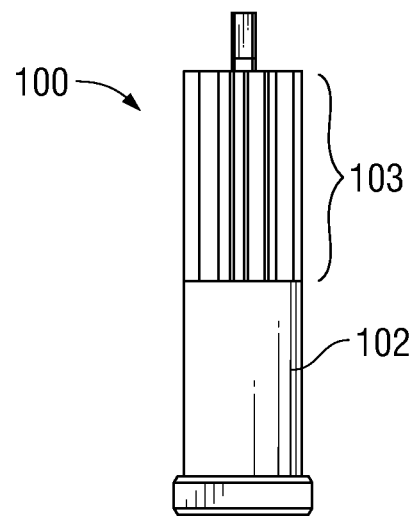
FIG. 2C  FIG. 2D

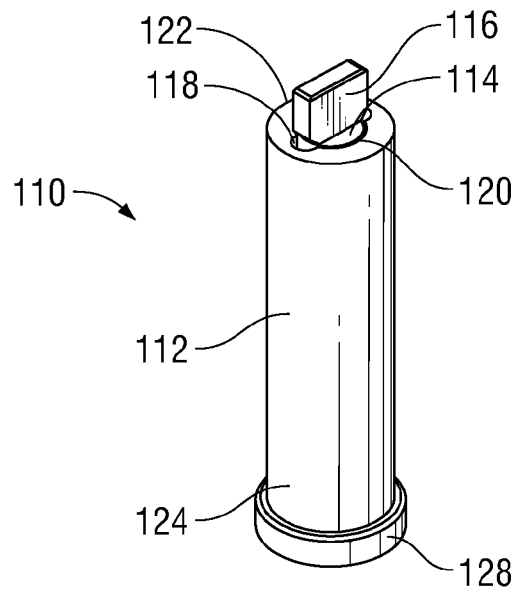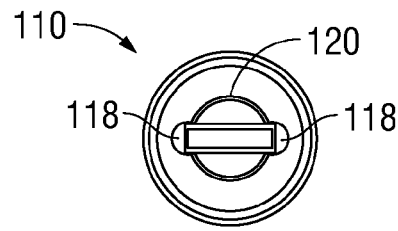
FIG. 3A  FIG. 3B
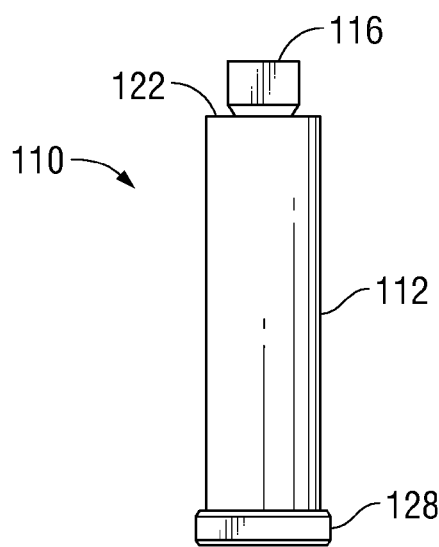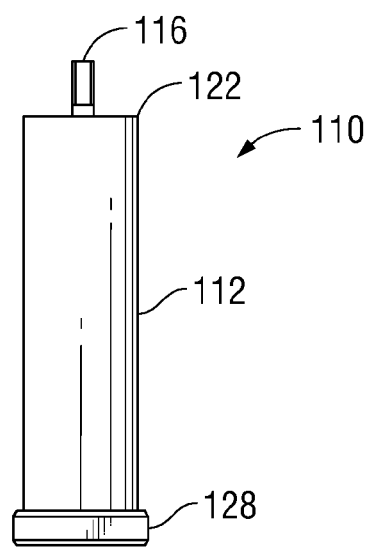
FIG. 3C  FIG. 3D

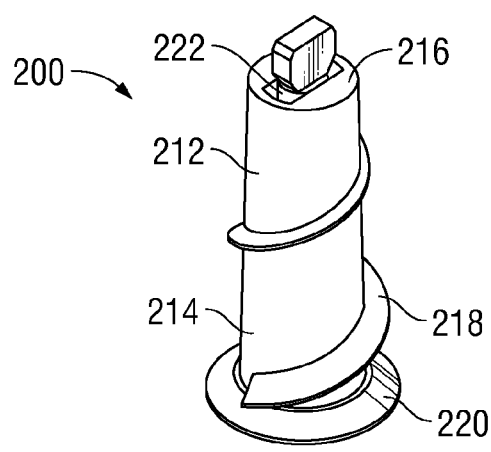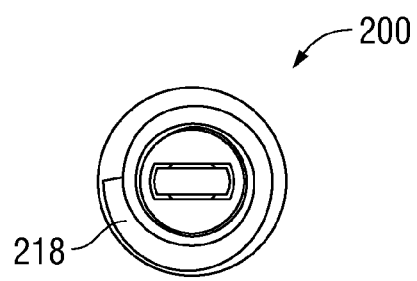
FIG. 4A  FIG. 4B
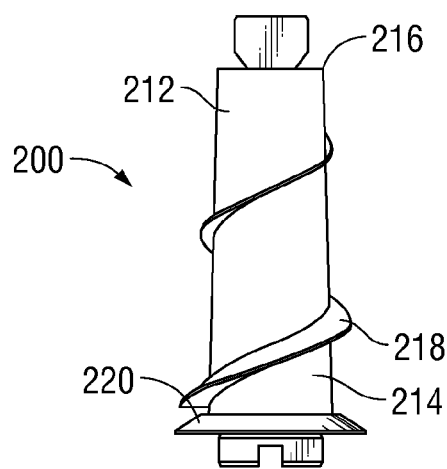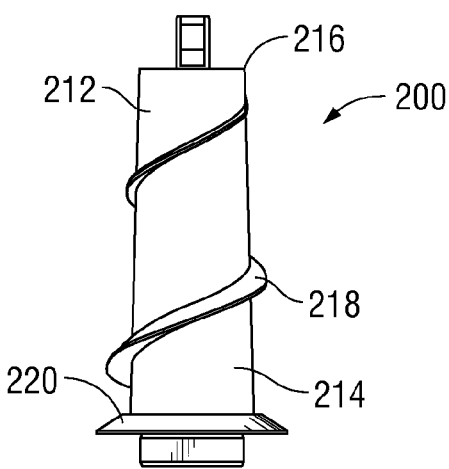
FIG. 4C  FIG. 4D

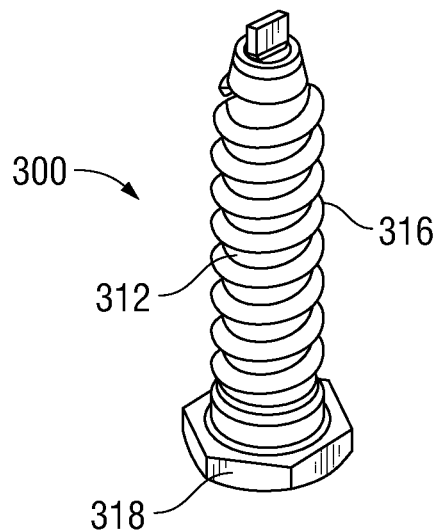
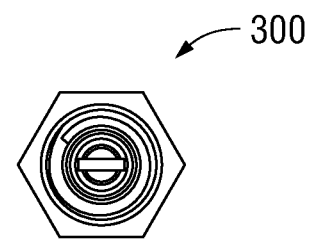
FIG. 5A  FIG. 5B
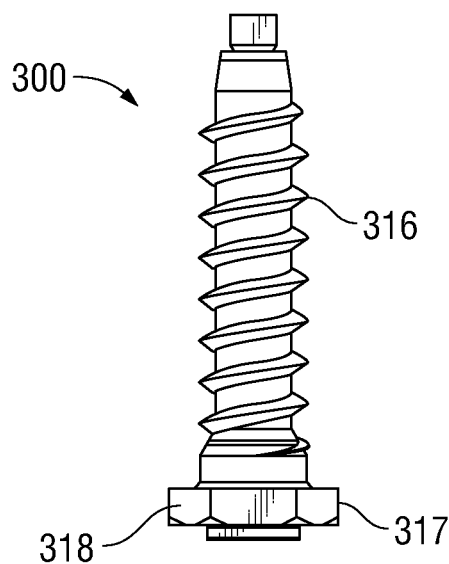
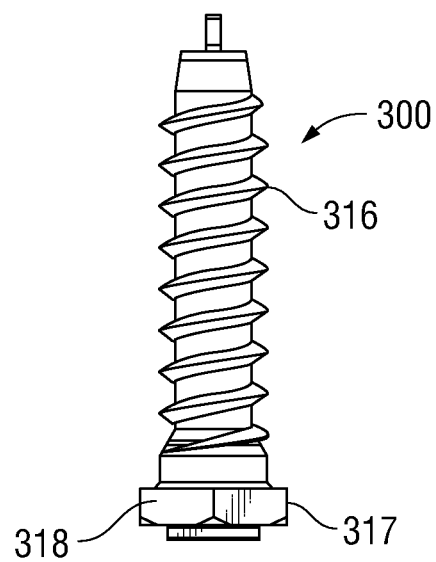
FIG. 5C  FIG. 5D

FIG. 6A  FIG. 6B

CONCEALABLE HOOK AND METHOD OF USE

CROSS-REFERENCE TO RELATED APPLICATIONS

The present application claims priority to U.S. Provisional Patent Application No. 61/637,703, filed on Apr. 24, 2012.

BACKGROUND OF THE INVENTION

For years, property owners have struggled with the annual ordeal of hanging holiday decorations on their homes and businesses. As every homeowner knows, hanging holiday lights and decorations is a time-consuming effort. Moreover, hanging holiday lights and decorations normally requires the use of nails, staples, hooks, or hot glue, each of which is semi-permanently hammered, driven or otherwise affixed to a building structure. Commonly, nails or hooks are applied to a home's exterior walls or fascia boards, and then holiday lights, garlands or other seasonal decorations can be hung from these nails or hooks. Similarly, staples can be driven into an exterior wall or fascia board in order to staple a strand of holiday lights, garland or wreath in place. Likewise, holiday decorations can even be affixed in place using a hot glue gun.

But nails and staples, once installed, are difficult to remove. Further, upon removal, they leave holes in the building structure. Use of these fasteners on stucco exteriors can also cause significant cracking in the stucco surface of a structure. These resulting holes and cracks must either be patched—entailing additional effort, as part of the seasonal-decoration removal process—or they are left, thereby exposing the building structure to the elements, putting the building structure at greater risk of damage and decay, due to incursion by water, fungi or insects.

On the other hand, leaving nails or staples in place after the seasonal decorations are removed creates a problem of unsightliness. This problem is compounded in the case of hooks installed for hanging seasonal decorations. A hook, such as a picture hanger, is typically larger and more noticeable than a nail or staple alone. Finally, use of glue to affix seasonal decorations either attaches those decorations permanently in place, or causes significant damage to paint, wood or stucco upon removal.

These difficulties and issues renders the process of installing and then removing holiday decorations to be take more time than the average homeowner would like to invest during typically hectic holiday seasons. As a result, homeowners may install fewer holiday decorations than they would otherwise wish or may even cause them to forego the holiday decorating process altogether.

Thus, there is a need to be able to hang decorations on the inside or outside of a building structure—such as, for example, Christmas lights on the exterior of a home, or garlands and wreaths on the interior walls of a home—using a device and method that allow the permanent placement of a hanging device which can be concealed when not in use and which can be used to quickly and efficiently hang decorations again when the next holiday season arrives.

A convenient and concealable hook is also needed in the interior of homes and businesses where residents or patrons want to temporarily hang outerwear, such as coats, or carried items, such as purses or backpacks. While it is common to use coat racks or large hooks for these applications, those permanently-visible hooks can be considered unsightly in modern homes and businesses. Additionally, due to the size of coat racks and large hooks, they are often placed in only a few locations, and are often an inconvenient distance away from where the owner of the coat or purse will be during his or her visit. This can limit their usefulness, particularly with respect to the hanging of valuable items such as purses or expensive coats. It is also understood that many women feel uncomfortable and worried by the prospect of leaving their purses in a location is that is out of reach and unsecured. That said, leaving a purse on the floor of a bar or a restaurant is undesirable because of food or drink that is spilled on the floor and the potential for exposing the purse to dirt, germs and bacteria on the floor. Leaving a "soft-sided" purse on the floor is also undesirable because, when placed on the floor such purses will often flop over and spill their contents. Likewise, hanging a purse on the back of a chair is often undesirable because, while nearby, it still leaves the purse generally behind or to the side of the seated owner, thereby making the purse more easily subject to being knocked to the floor by inadvertent passersby or being picked (or even stolen entirely) by a thief.

Moreover, in certain environments, such as restaurants and bars, the number of permanent coat racks or exposed hooks needed for patrons to hang purses and coats can detract from both the appearance of the establishment as well as permanently take up valuable floor space that could otherwise be occupied by patrons. In those bars and restaurants that use conventional hooks under the main bar or on table edges to hang purses and coats, those large hooks may cause injury to the knees and legs of unknowing or unassuming patrons.

Thus, there is a further need to be able to have convenient, inconspicuous and concealable hooks in homes and businesses that are permanently affixed to walls, restaurant tables, bars and booths, but that can be concealed when not in use and that do not have dangerous projections, thereby preserving the appearance of the interior and making better use of the available home or restaurant space, while enhancing the security and availability of the purse or coat which has been hung upon such a concealable hook.

SUMMARY OF THE INVENTION

The present invention addresses and alleviates these problems with prior art hanging devices. While various embodiments of the present invention exist, as will be understood by one of ordinary skill in the art, each generally includes a pin moveably engaged inside of a sleeve and configured such that the proximal end of the pin can be either extended or retracted, and with the distal end of the pin configured such that the pin cannot be completely removed from the sleeve when the pin is moved to the extended position. The sleeve and pin may have a variety of different configurations, to maximize the ease of installation, concealability, holding power and effectiveness of the concealable hook when used in different building structure materials, such as wood, drywall, stucco, concrete or sheet metal.

Embodiments of the device can be used to hang a variety of decorations or seasonal items. Generally, a device embodying the present invention is used by an installer by drilling a hole in the building structure of a diameter that is about the same or slightly smaller than as the outside diameter of the hanging device sleeve. Then, the installer hammers, screws or otherwise drives the hanging device into the hole in the building structure such that the proximal end of the sleeve of the device is flush with the surface of the building structure. Then, the installer can grip the proximal end of the pin and move it into an extended position, thereby exposing a portion of the pin. The installer can use the extended portion of the pin to hang or secure holiday decorations, such as, for example, a part of a strand of holiday lights. When the holiday season is over and the holiday decorations are removed from the building, the installer removes the holiday lights from the extended portion of the pin, and then pushes the pin back into a retracted position inside the sleeve. Upon retraction, the head of the pin is generally flush with the surface of the building structure, thus concealing it from casual observation and eliminating the need to remove the hanging device. In some embodiments, the head of the pin can be painted to match the surface of the building structure, thus further concealing it from casual observation. Moreover, once the hanging device of the present invention is installed, it can be left in place permanently. Thus the hanging device is already installed in the building structure for the next time that seasonal holiday decorations will be hung from that point on the building, thereby resulting in a smaller expenditure of time to hang holiday decorations in subsequent years after the hanging device of the present invention has been installed the first time.

Embodiments of the invention can also be used to temporarily hang outerwear, purses or bags at homes or in restaurants and bars. While generally similar in form and operation to the other embodiments discussed herein, embodiments for this purpose may be attached to walls, the undersides of bars, table legs or the sides of restaurant booths. When configured for this purpose, the proximal portion of the pin can be embellished with an ornamental or otherwise very easily grasped head, so that it can be easily seen by persons using the device.

Thus, the present invention addresses and alleviates several problems with prior art hanging devices. It provides the ability to hang seasonal decorations on either the inside or outside of a building structure, while eliminating the need to remove nails, staples or unsightly plastic hooks at the end of the holiday season, further eliminating the possibility of damaging the paint, wood, stucco, concrete or metal trim of the building structure by leaving a rust stain if the nails or hooks are not removed, or damaging the building structure by leaving holes or marring paint by the removal of a nail, staple, or hanger. Further, the present invention provides a device and method for hanging holiday decorations on a building structure such that the hangers are permanently affixed to the building but can be retracted and therefore concealed when not in use, thus eliminating the unsightly effect of leaving exposed hangars in the structure year round and reducing the amount of time needed in subsequent holiday seasons to hang holiday decorations. Additionally, it provides the ability to temporarily hang outerwear, purses or bags in way that eliminates the need for traditional coat racks or large purse hooks and improves the accessibility and security of such items.

BRIEF DESCRIPTION OF THE DRAWINGS

FIG. 2A is a perspective view of a second embodiment of the invention.

FIG. 2B is a top view of a second embodiment of the invention.

FIG. 2C is a side view of a second embodiment of the invention.

FIG. 2D is a second side view of the second embodiment, showing the moveably engaged pin rotated by ninety degrees.

FIG. 3A is a perspective view of a third embodiment of the invention.

FIG. 3B is a top view of a third embodiment of the invention.

FIG. 3C is a side view of a third embodiment of the invention.

FIG. 3D is a second side view of the third embodiment, showing the moveably engaged pin rotated by ninety degrees.

FIG. 4A is a perspective view of a fourth embodiment of the invention.

FIG. 4B is a top view of a fourth embodiment of the invention.

FIG. 4C is a side view of a fourth embodiment of the invention.

FIG. 4D is a second side view of the fourth embodiment, showing the moveably engaged pin rotated by ninety degrees.

FIG. 5A is a perspective view of a fifth embodiment of the invention.

FIG. 5B is a top view of a fifth embodiment of the invention.

FIG. 5C is a side view of a fifth embodiment of the invention.

FIG. 5D is a second side view of the fifth embodiment, showing the moveably engaged pin rotated by ninety degrees.

FIG. 6A is a perspective view of a sixth embodiment of the invention.

FIG. 6B is a top view of a sixth embodiment of the invention.

DETAILED DESCRIPTION OF THE EMBODIMENTS

Figure 1A:
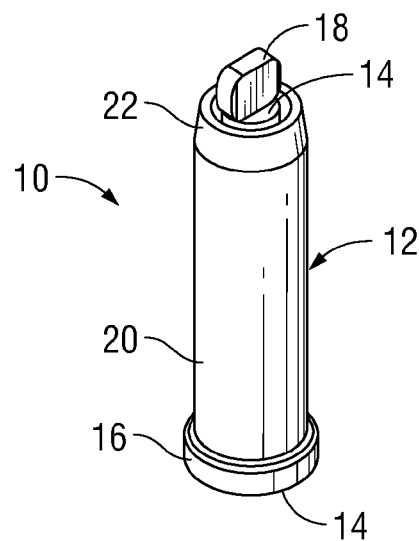
FIG. 1A is a perspective view of a first embodiment of the invention.
Figure 1B:
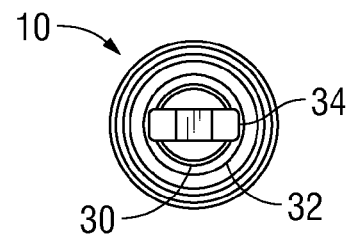
FIG. 1B is a top view of a first embodiment of the invention.
Figure 1C:
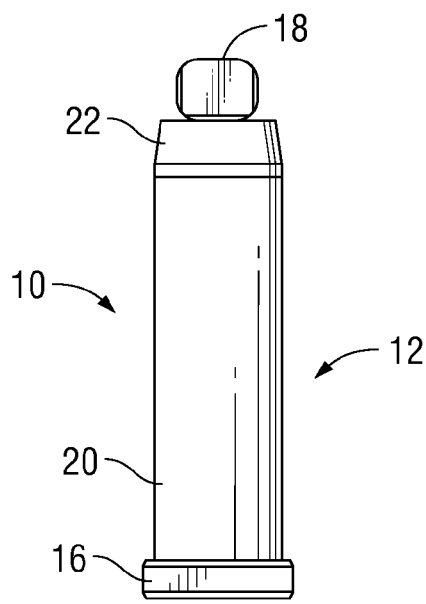
FIG. 1C is a side view of a first embodiment of the invention.
Figure 1D:
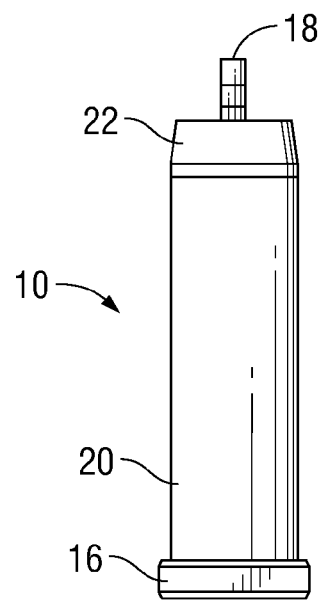
FIG. 1D is a second side view of the first embodiment, showing the moveably engaged pin rotated by ninety degrees.
Figure 1E:
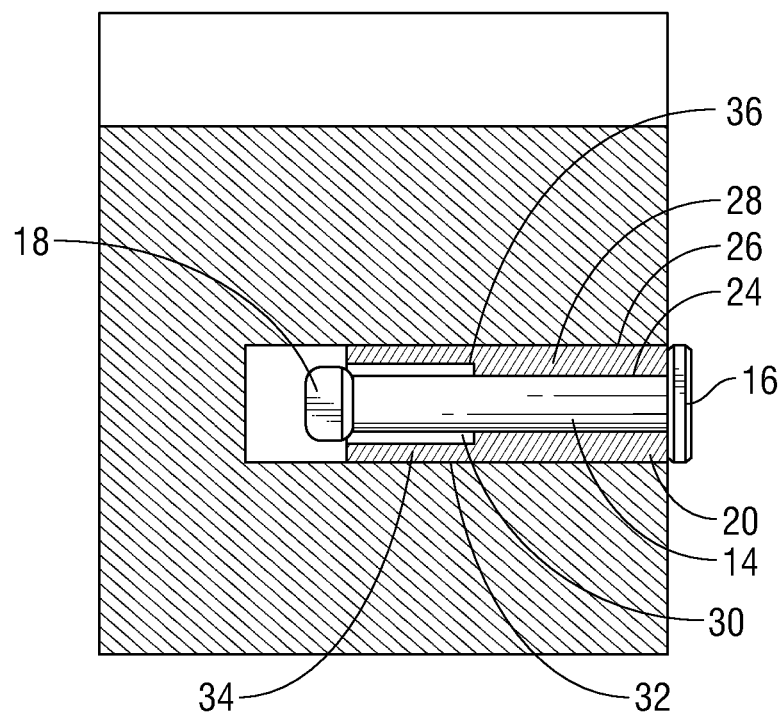
FIG. 1E is a side view cutaway drawing of the first embodiment of the invention, showing the device in place as installed and with the pin in a retracted position.
Figure 1F:
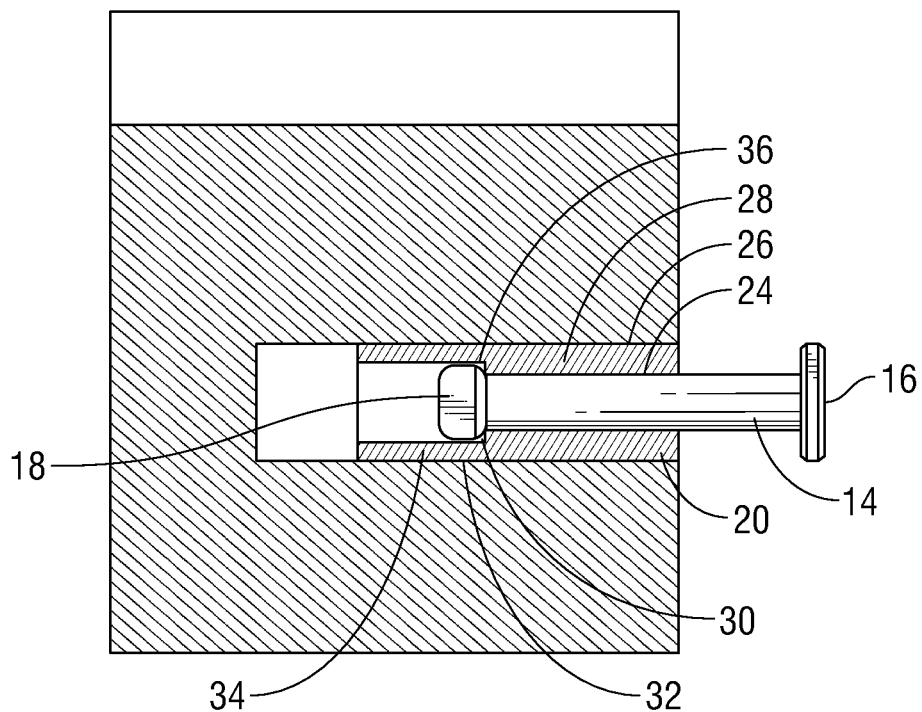
FIG. 1F is a side view cutaway drawing of the first embodiment of the invention, showing the device in place as installed and with the pin in an extended position.
Figure 1G:
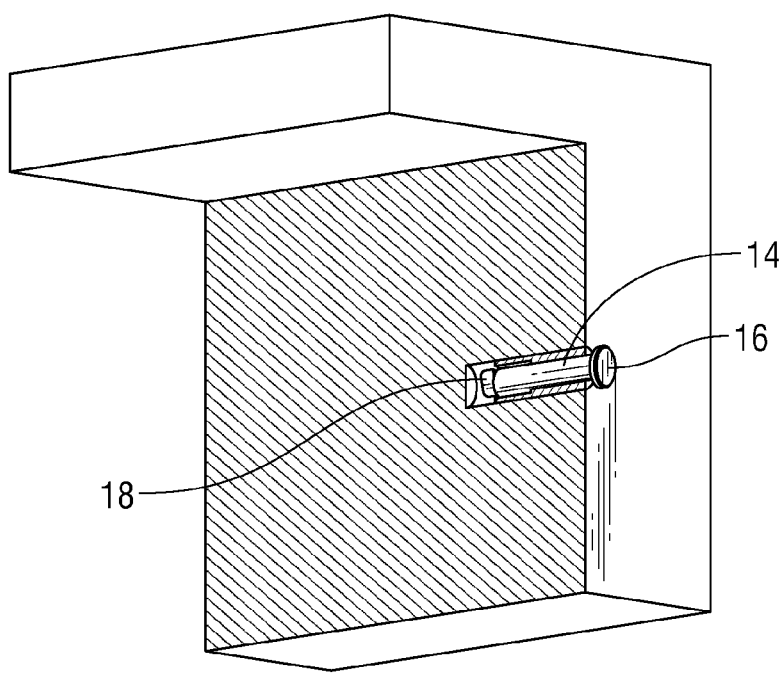
FIG. 1G is a three-quarter perspective view, cutaway drawing of the first embodiment of the invention, showing the device in place as installed and with the pin in a retracted position.
Figure 1H:
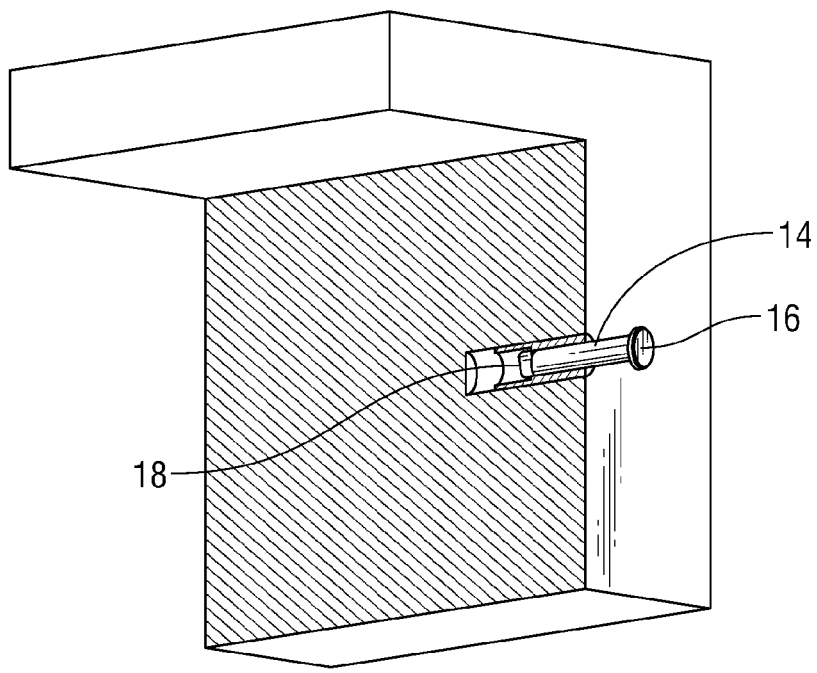
FIG. 1H is a three-quarter perspective view, cutaway drawing of the first embodiment of the invention, showing the device in place as installed and with the pin in an extended position.
Figure 1I:
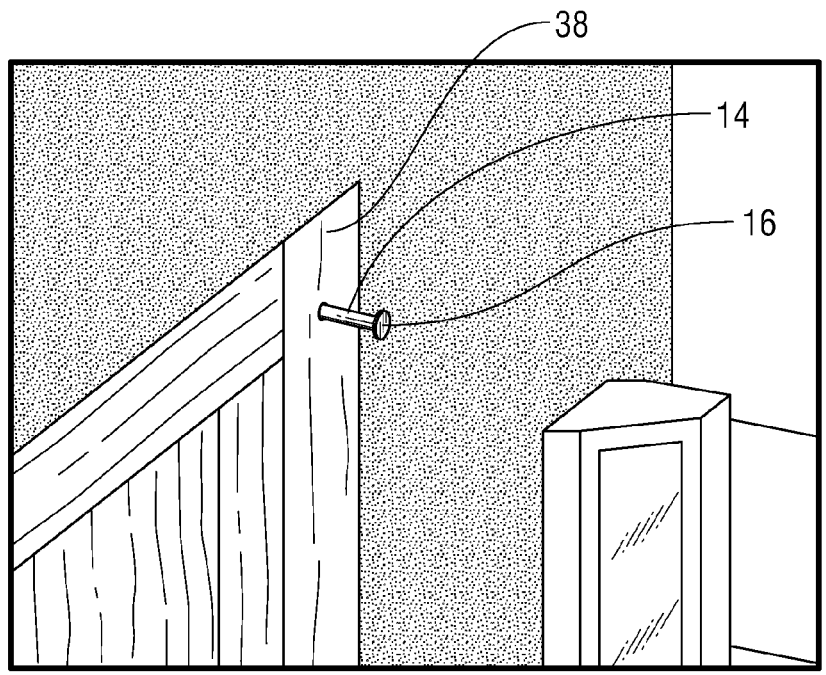
FIG. 1I illustrates the first embodiment of the invention in place as installed in the wood of the top right corner of a doorframe and with the pin in an extended position.

A first embodiment of the concealable hanging device of the present invention is illustrated in FIGS. 1A-J. It will be appreciated that the hanging device 10 includes a sleeve 12 and a pin 14, both preferably composed of galvanized aluminum, enabling the device to be resistant to corrosion and/or rust due to exposure to weather. The pin 14 includes a head 16 and a tip 18, and is moveably engaged inside the sleeve 12. The pin 14 may be placed in either an extended position or a retracted position, as shown in FIGS. 1A-H. The pin 14 is oriented such that the head 16 is located near the proximal end 20 of the sleeve 12 and the tip 18 of the pin 14 is located near the distal end 22 of the sleeve 12. At the proximal end 20 of the sleeve, the sleeve 12 has a first inside diameter 24 and an outside diameter 26, defining a lateral thickness 28 of the wall of the sleeve 12. At the distal end 22 of the sleeve 12, the sleeve has a second inside diameter 30 and an outside diameter 32, defining a second lateral thickness 34 of the wall of the sleeve 12. The second inside diameter 30 is generally larger than the first inside diameter 24; therefore the second lateral thickness 34 is generally thinner than the first lateral thickness 28. This difference defines an annular shelf 36 inside the sleeve 12. The tip 18 of the pin 14 is configured to be wider than the first inside diameter 24 of the sleeve 12. Preferably, the tip 18 of the pin 14 is configured as a tab. However, the tip of the pin may also be configured as any other suitable stopping means, such as a ball, a flat head, a mushroom-shaped hemisphere, an inverted cone, a flattened nail point, a finished nail head, a cap screw head, a pan head, a pin insert such as a cotter pin, a threaded pin, or a pressed pin, or a plastic cap. When the pin 14 is moved by a user to the extended position, the tip 18 engages the annular shelf 36, preventing the pin 14 from being removed from the sleeve 12. Preferably, the head 16 of the pin 14 is configured as a flat nail head as shown. It may also be configured as a slotted or Phillips screw head. When the pin 14 is moved by a user into the retracted position, the pin head 16 engages the proximal end 20 of the sleeve 12, preventing the pin 14 from being driven so far into the sleeve 12 that it cannot be reached to be retracted.

Though not shown, as one of ordinary skill in the art would appreciate, the pin may be configured so that the tip of the pin extends a significant distance beyond the distal end of the sleeve when in the retracted position and such that the pin engages the distal end of the sleeve when the pin is moved to an extended position. In such a configuration, the sleeve may be of a uniform inner diameter because the tip of the pin need not engage an annular shelf to prevent withdrawal of the pin when moving to an extended position.

As one of ordinary skill in the art would further appreciate, the inside of the sleeve may be configured in such a way that it includes inward pointing tabs, stops, prongs, a washer-like annular ring, or other structures which may engage the tip of the pin to prevent it from being completely removed from the sleeve when the pin is moved into an extended position. Also preferably, the sleeve is not expandable or deformable.

Figure 1J:
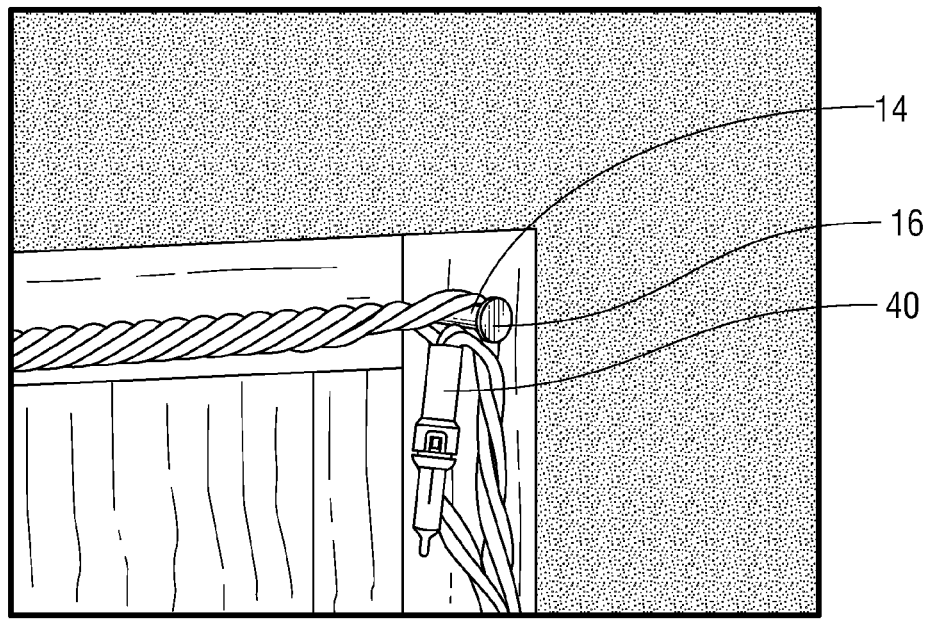
FIG. 1J illustrates a close-up view of the first embodiment of the invention in place as installed in the wood of the top right corner of a doorframe, with the pin in an extended position and a string of holiday lights engaged to the extended pin.
Figure 2E:
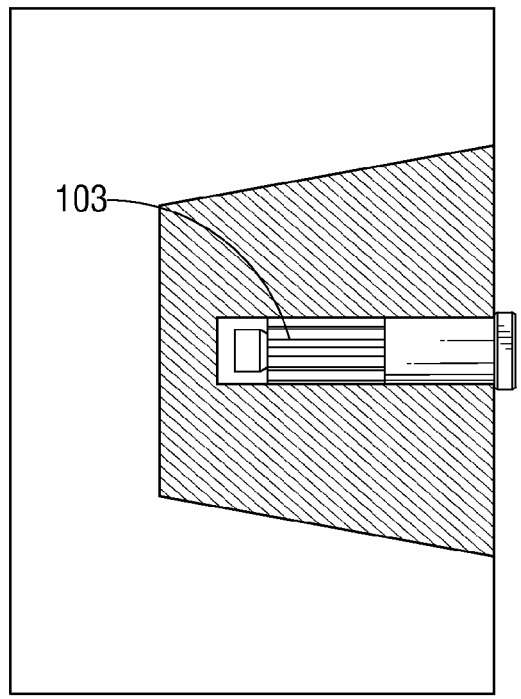
FIG. 2E is a side view cutaway drawing of the second embodiment of the invention, showing the device in place as installed and with the pin in a retracted position.
Figure 2F:
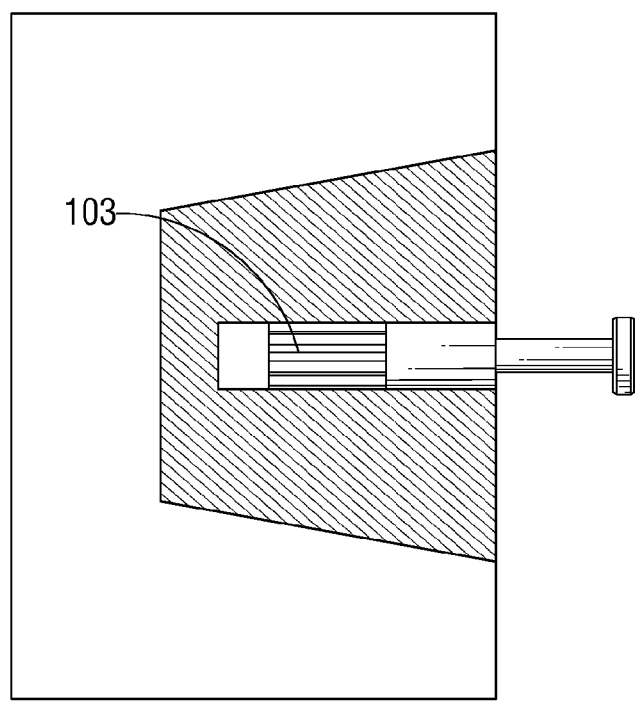
FIG. 2F is a side view cutaway drawing of the second embodiment of the invention, showing the device in place as installed and with the pin in an extended position.

In use, the concealable hanging device 10 of FIGS. 1A-H, is hammered, screwed or driven into a building structure, such as the wood frame of a doorway 38. Preferably, before the concealable device is driven into the building structure, a small pilot hole is drilled to ease the installation of the concealable hanging device. Once installed, the sleeve should be generally immovable, because it is engaged, by friction, in the building structure. Then, the pin 14 may be moved into the extended position, and used as a hook to hang, for example, a portion of a strand of Christmas lights 40, as shown in FIG. 1J. Preferably, multiple concealable hanging devices of the present invention are used, one of which is installed at each location necessary to hang the entire strand of lights, or any and all decorations. Then, when the decorations are removed, the pin can be moved inwardly to the retracted position, thereby making it unobtrusive to the casual observer of the building structure. As a result, the concealable hanging device should not be removed from the building structure when the decorations are removed. Instead, it can be left in place with the pin in a recessed position, thereby concealing it from casual observation. This eliminates the possibility of leaving holes in the building structure due to removal of the device. Further, assuming that the building structure is decorated with the same type and style of decorations the following year, the concealable hanging device of the present invention is already in place for the next season, allowing for the user to simply move the pin to the extended position and hang the holiday lights as before, without the need to use new nails, staples, or hooks.

Preferably, for each installed concealable hanging device, the head 16 of the pin 14, as well as the proximal end 20 of the sleeve 12, are painted or otherwise colored to match color of the paint at the location of the building structure where each concealable hanging device is installed. This will further reduce the potential for each installed concealable hanging device to be observed by a casual observer.

A second embodiment of the concealable hanging device of the present invention is illustrated in FIGS. 2A-F. The second embodiment concealable hanging device 100 is of the same general configuration as the first embodiment, with additional structure added to the sleeve. As illustrated particularly in FIGS. 2A-D, the outside of the sleeve 102 is configured to include friction increasing means 103. As shown, the friction increasing means include lands 104 and grooves 106 machined into the outside of the sleeve 102, so as to enable it to more effectively engage the building material in which it is mounted, particularly wood. Other friction increasing means which are not shown but are readily understood to one of skill in the art include spirally-oriented lands and grooves, longitudinally oriented vanes extending laterally outward from the wall of the sleeve, spiral longitudinally oriented vanes extending laterally outward from the wall of the sleeve, dimples or divots in the surface of the sleeve, bumps, points or prongs extending outward from the surface of the sleeve, or any combination thereof.

A third embodiment of the hanging device of the present invention is illustrated in FIGS. 3A-H. This third embodiment is applicable generally as discussed above, but also has special application in installations where the concealable hook must be installed vertically, in a location where the force of gravity might naturally move the pin from a retracted position to an extended position, when the concealable hook device is not in use and such extension is undesirable because it would make the device readily observable.

Figure 3E:
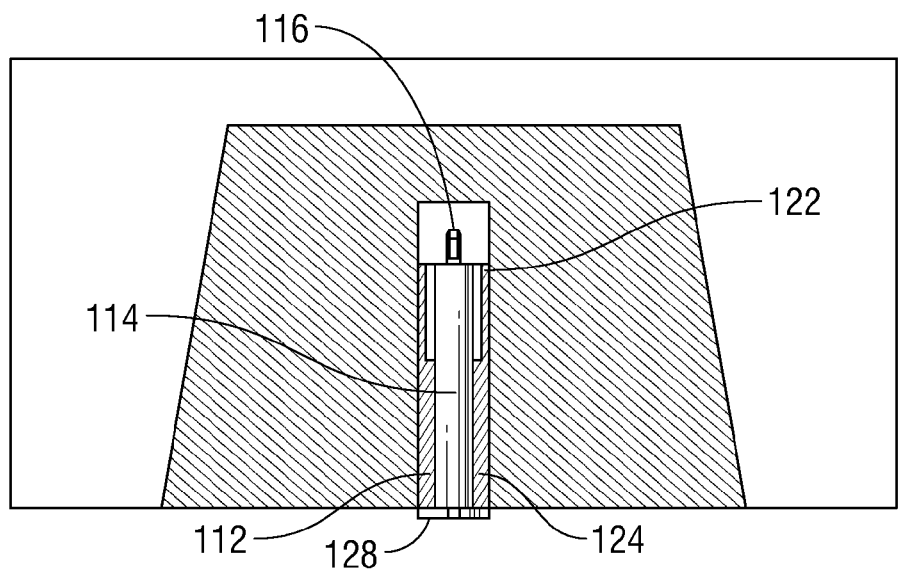
FIG. 3E is a side view cutaway drawing of the third embodiment of the invention, showing the device in place as installed, and with the pin in a retracted position.
Figure 3F:
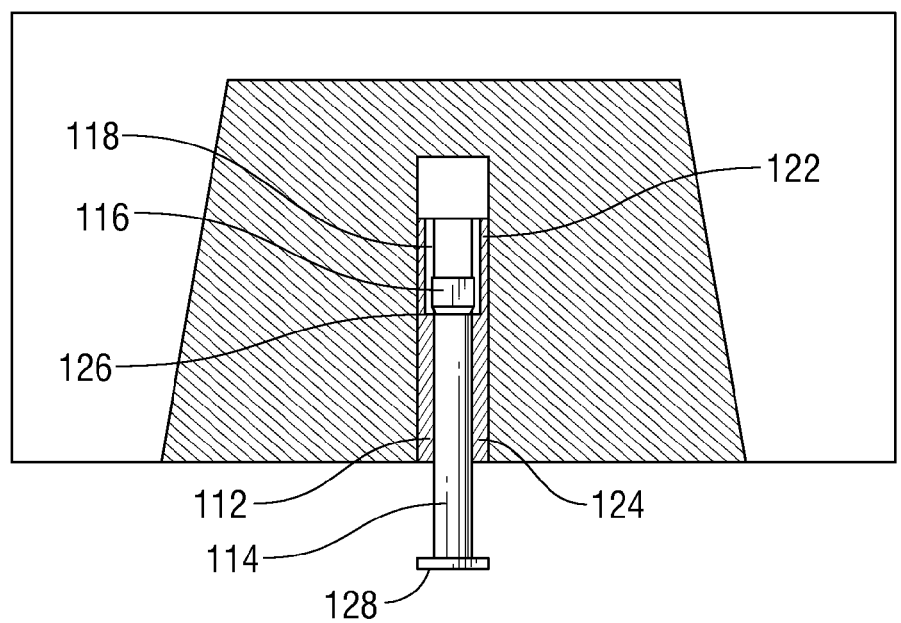
FIG. 3F is a side view cutaway drawing of the third embodiment of the invention, showing the device in place as installed and with the pin in an extended position.
Figure 3G:
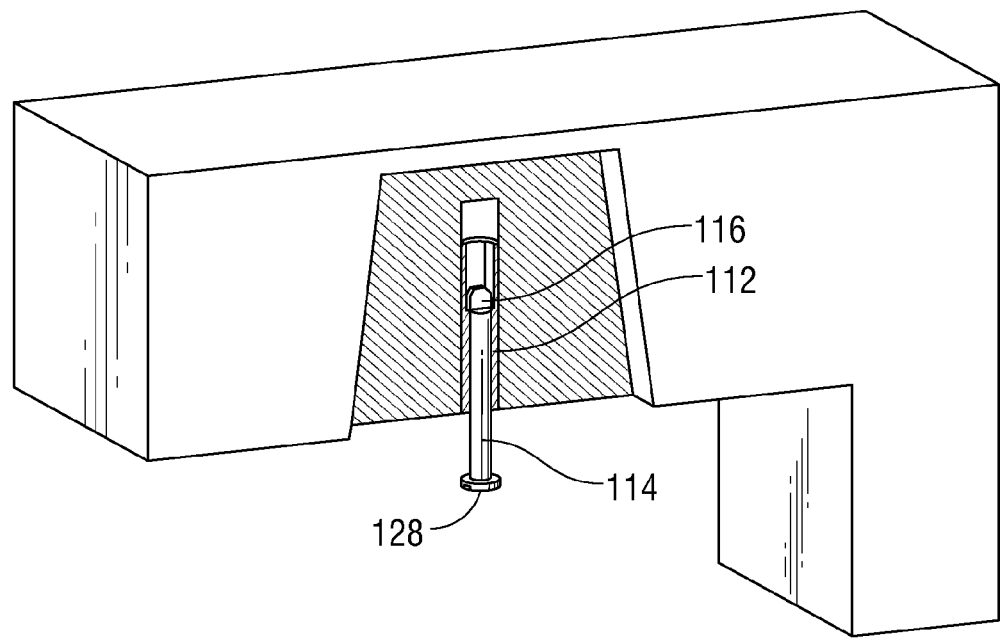
FIG. 3G is a three-quarter perspective view, cutaway drawing of the third embodiment of the invention, showing the device in place as installed and with the pin in an extended position.
Figure 3H:
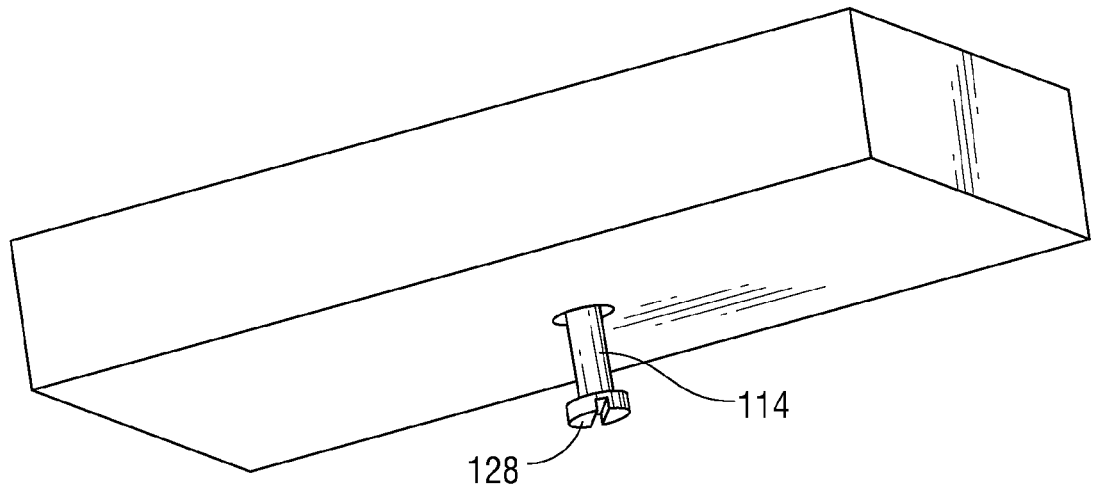
FIG. 3H is a three-quarter perspective view drawing of the third embodiment of the invention, showing the device in place as installed and with the pin in an extended position.
Figure 4E:
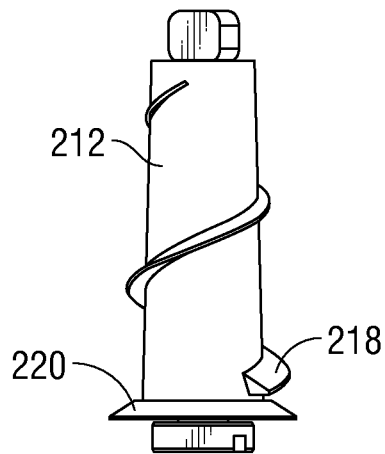
FIG. 4E is a side view drawing of the fourth embodiment of the invention, showing the pin in a retracted position.
Figure 4F:
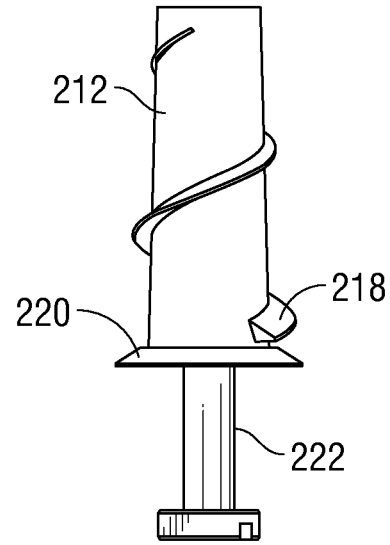
FIG. 4F is a side view drawing of the fourth embodiment of the invention, showing the pin in an extended position.
Figure 4G:
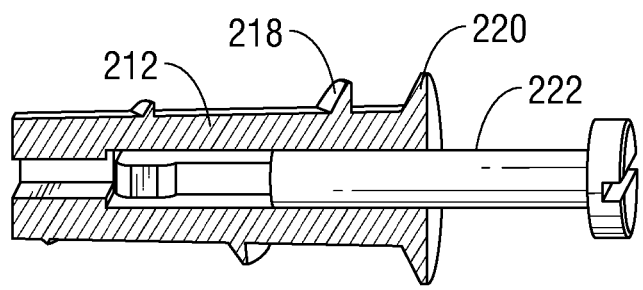
FIG. 4G is a side view cutaway drawing of the fourth embodiment of the invention, showing the pin in an extended position and the tab able to engage the sleeve inner diameter slot.
Figure 4H:
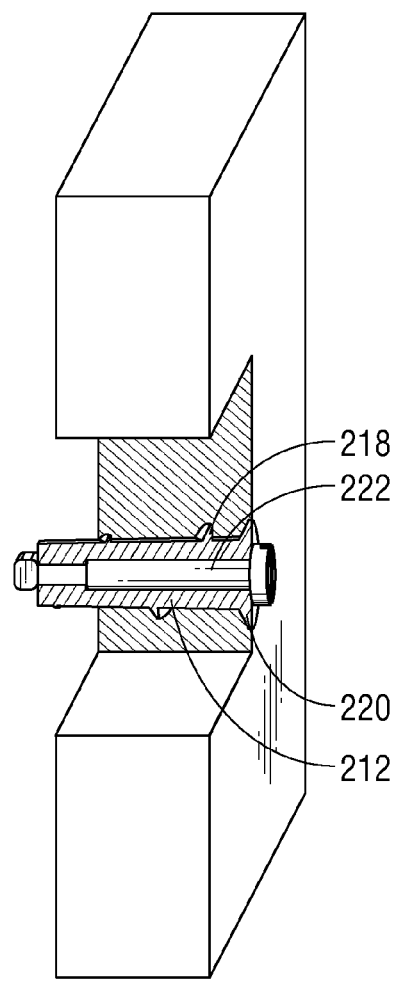
FIG. 4H is a three-quarter perspective view, cutaway drawing of the fourth embodiment of the invention, showing the device in place as installed and with the pin in a retracted position.
Figure 4I:
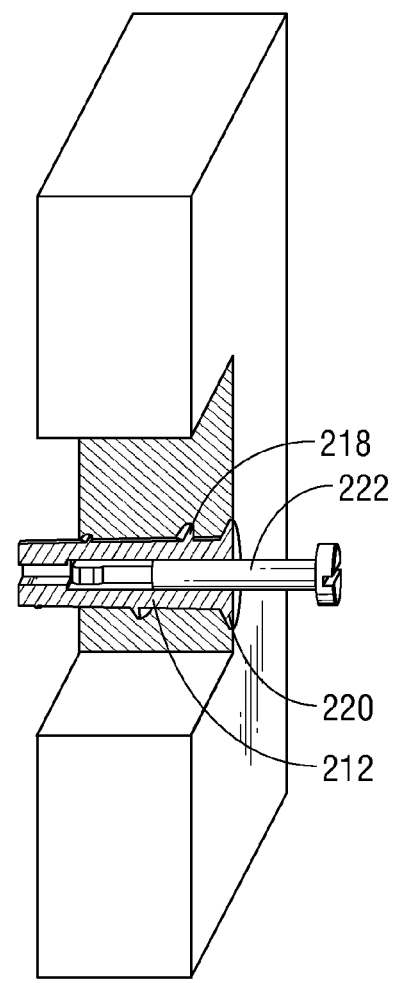
FIG. 4I is a three-quarter perspective view, cutaway drawing of the fourth embodiment of the invention, showing the device in place as installed and with the pin in an extended position.
Figure 4J:
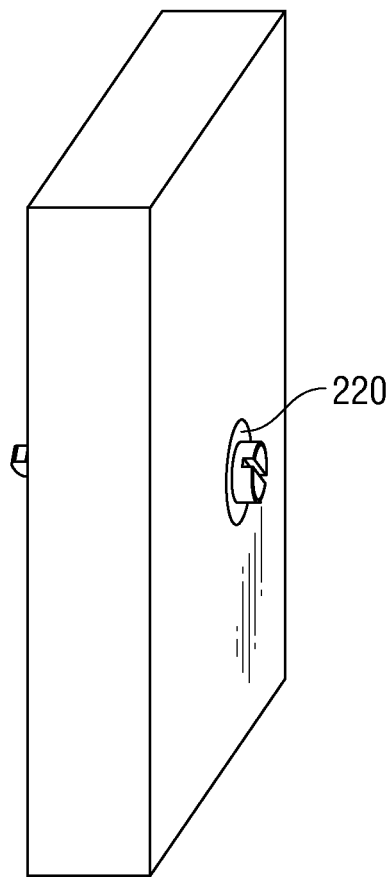
FIG. 4J is a three-quarter perspective view drawing of the fourth embodiment of the invention, showing the device in place as installed and with the pin in a retracted position.
Figure 5E:
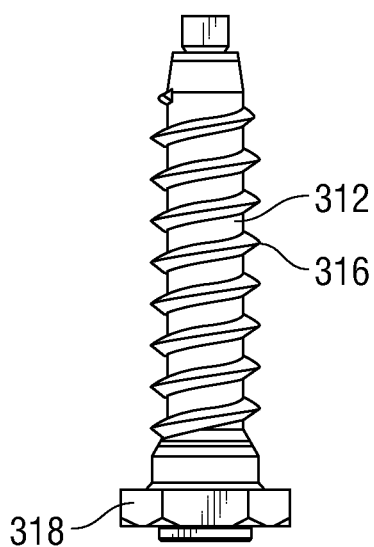
FIG. 5E is a side view drawing of the fifth embodiment of the invention, showing the device with the pin in a retracted position.
Figure 5F:
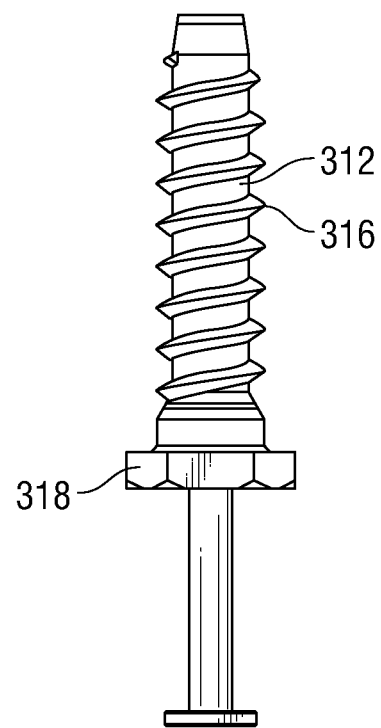
FIG. 5F is a side view drawing of the fifth embodiment of the invention, showing the device with the pin in an extended position.
Figure 5G:
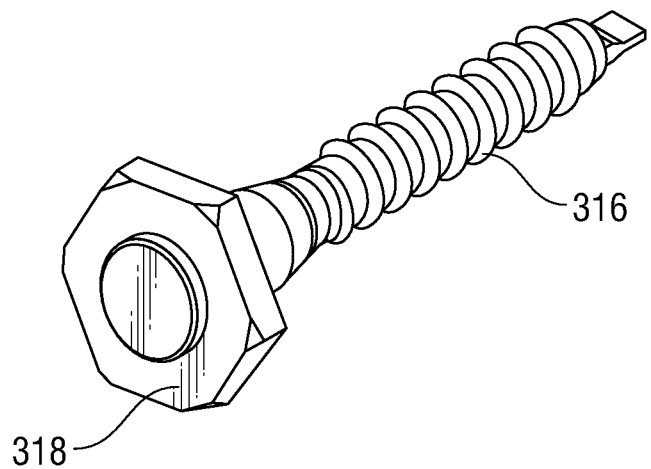
FIG. 5G illustrates the fifth embodiment of the invention with the pin in a retracted position.
Figure 5H:
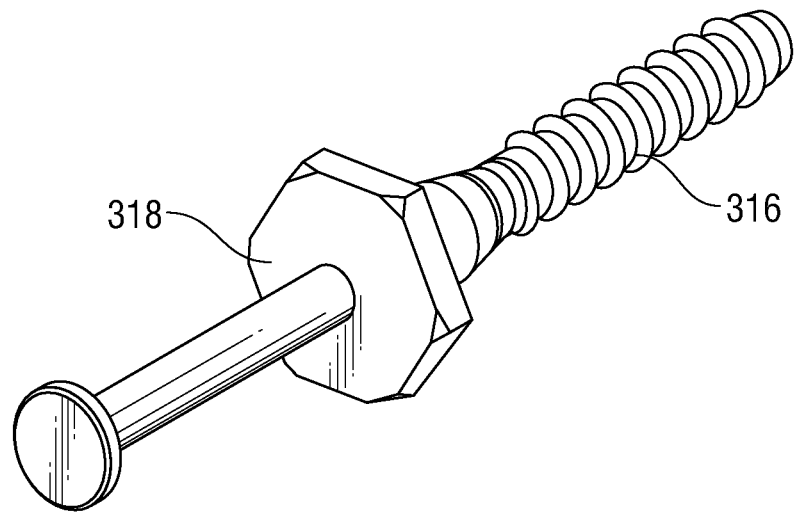
FIG. 5H illustrate the fifth embodiment of the invention with the pin in an extended position.
Figure 5I:
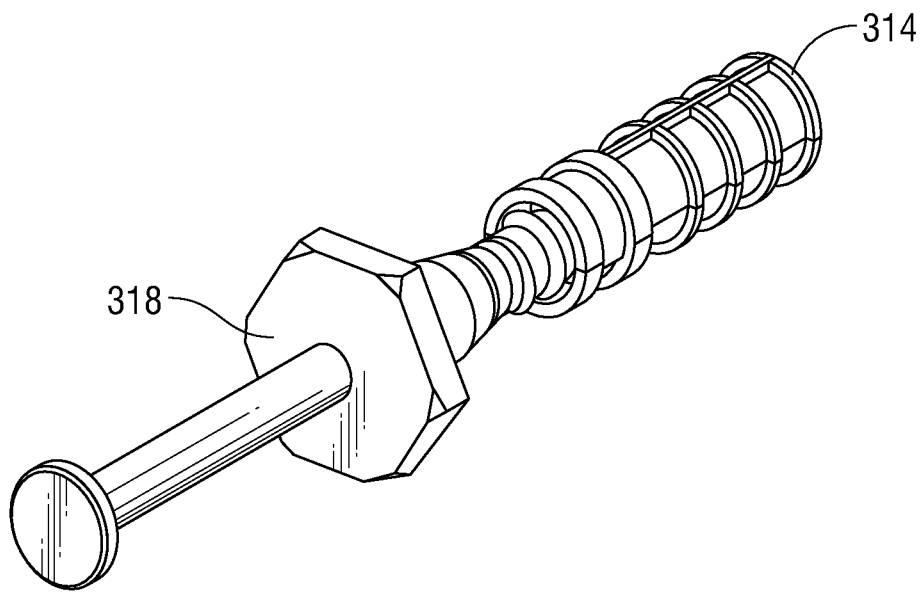
FIG. 5I illustrate the fifth embodiment of the invention, with the device partially engaged to a shield anchor for use in stucco or concrete applications, with the pin in an extended position.
Figure 5J:
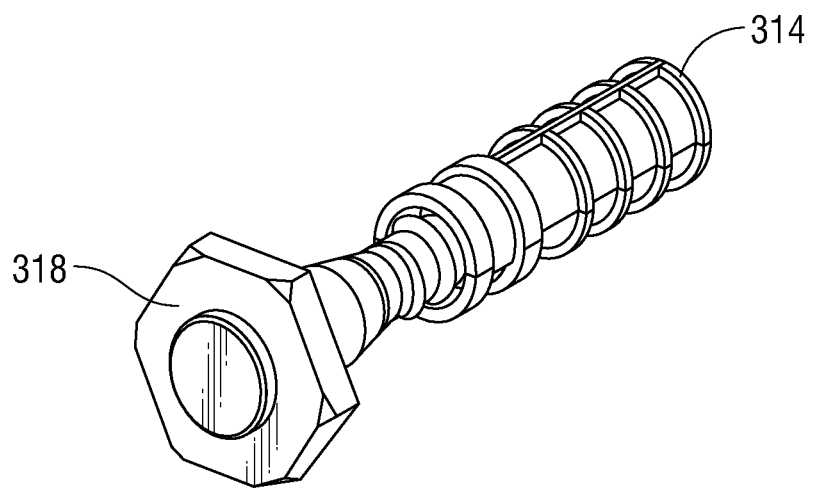
FIG. 5J illustrates the fifth embodiment of the invention, with the device partially engaged to a shield anchor for use in stucco or concrete applications, with the pin in a retracted position.
Figure 5K:
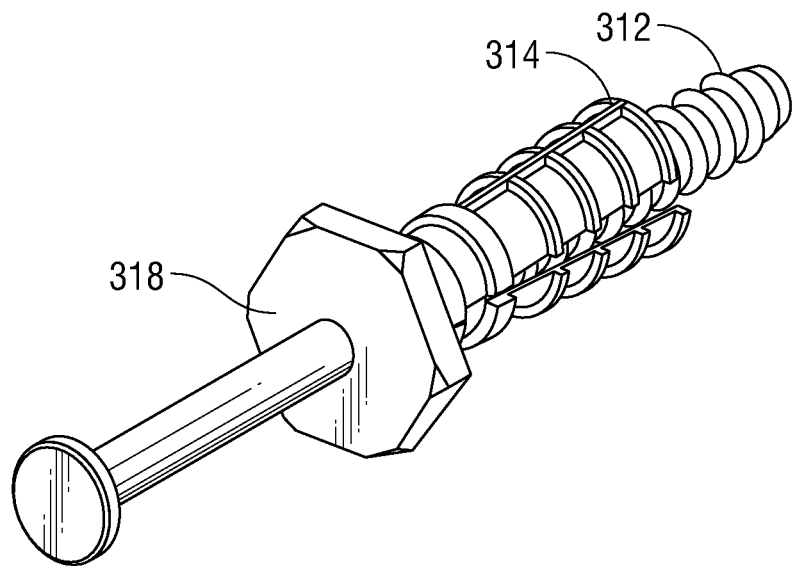
FIG. 5K illustrates the fifth embodiment of the invention, with the device fully engaged to a shield anchor for use in stucco or concrete applications, with the pin in a retracted position.
Figure 5L:
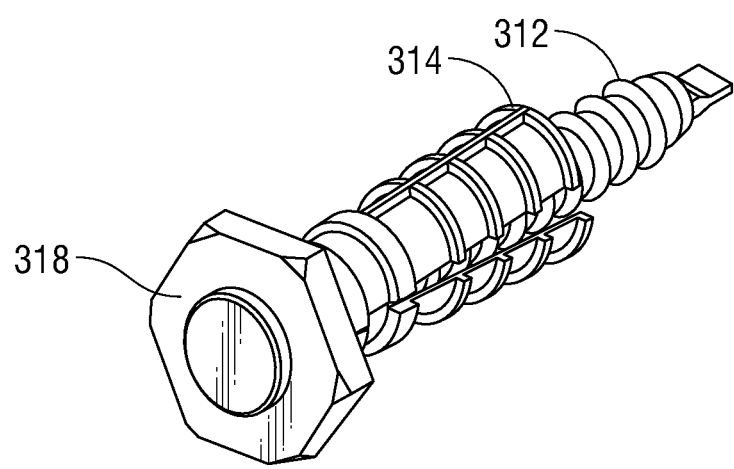
FIG. 5L is a photograph of the fifth embodiment of the invention, with the device fully engaged to a shield anchor for use in stucco or concrete applications, with the pin in an extended position.
Figure 5M:
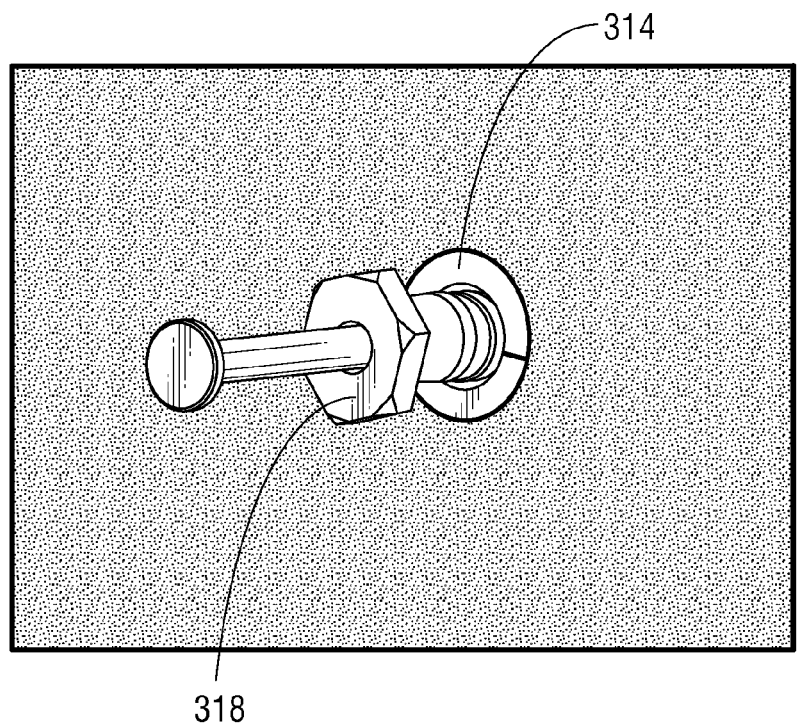
FIG. 5M illustrates the fifth embodiment of the invention in place as partially installed in a stucco wall, with the device partially engaged with a shield anchor that is flush-mounted in the stucco wall, and with the pin in an extended position.
Figure 5N:
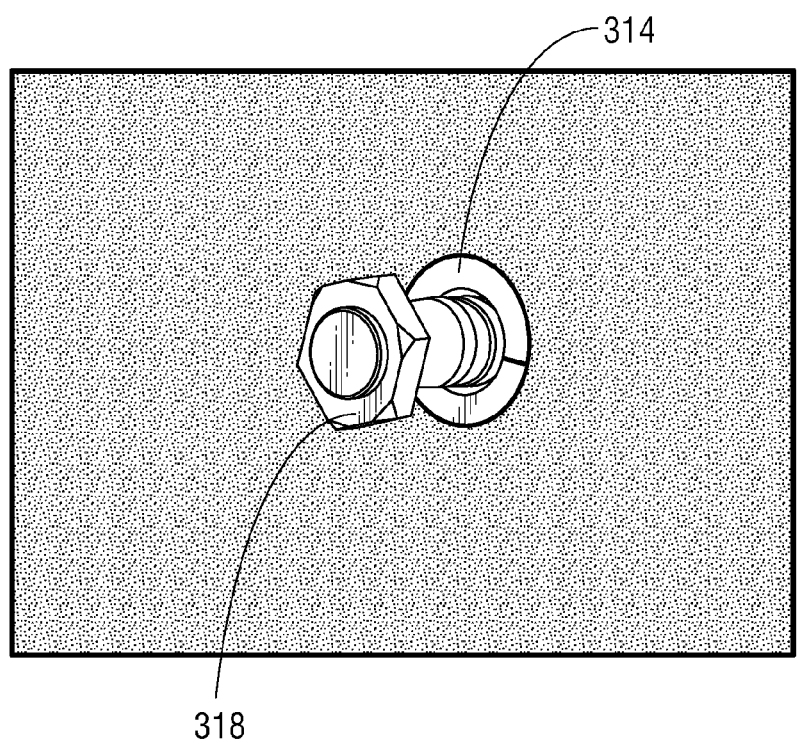
FIG. 5N illustrates the fifth embodiment of the invention in place as partially installed in a stucco wall, with the device partially engaged with a shield anchor that is flush-mounted in the stucco wall, and with the pin in a retracted position.
Figure 5O:
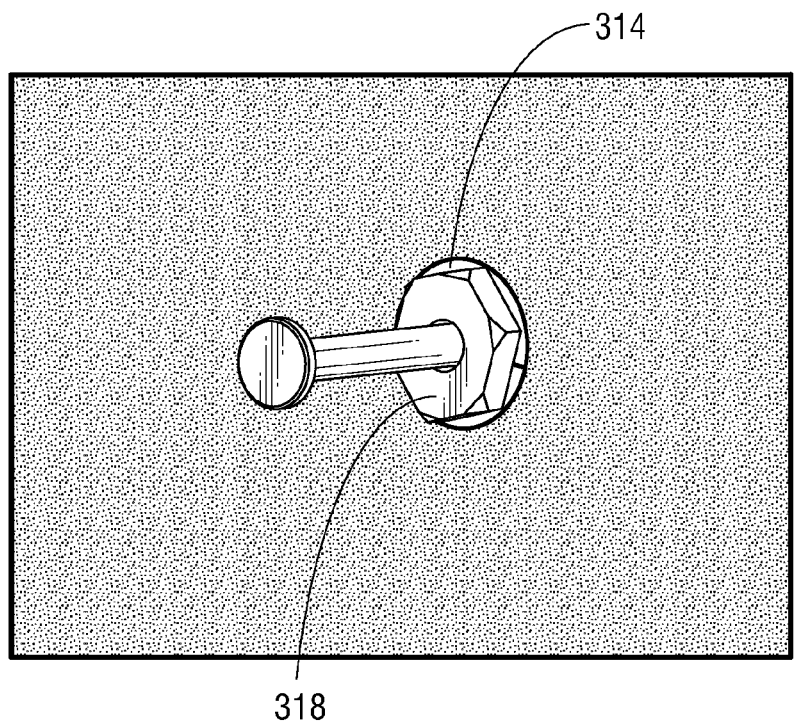
FIG. 5O illustrates the fifth embodiment of the invention in place as fully installed in a stucco wall, with the device fully engaged with a shield anchor that is flush-mounted in the stucco wall, and with the pin in an extended position.
Figure 5P:
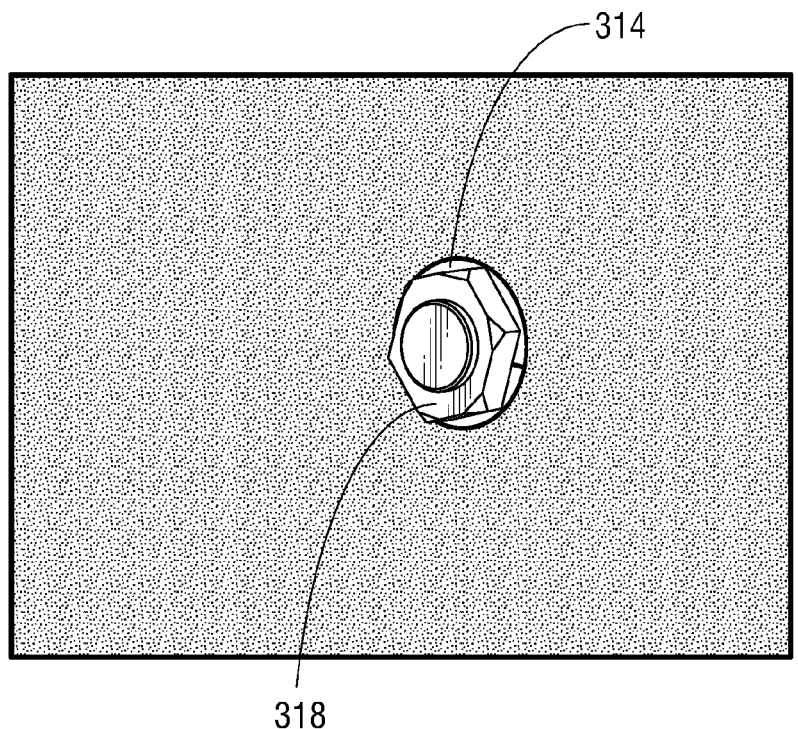
FIG. 5P illustrates the fifth embodiment of the invention in place as fully installed in a stucco wall, with the device fully engaged with a shield anchor that is flush-mounted in the stucco wall, and with the pin in a retracted position.

As shown in FIGS. 3A-H, this vertical application concealable hook 110 is similar in configuration to the embodiments discussed above. However, it preferably includes a pin 114 having a tab-shaped distal end 116. The sleeve 112 is configured to include a longitudinally oriented slot 118 cut into the inside diameter 120 of the distal end 122 of the sleeve 112. This slot 118 extends from the distal end 122 of the sleeve 112, toward the proximal end 124 of the sleeve 112, and along between about one-third to one-half of the length of the sleeve 112. The slot 118 terminates at a point within the sleeve 112 that forms one or more interior shelves 126. The pin 114 is rotatable within the sleeve 112. The proximal end 128 of the pin 114 should be configured such that a user can easily rotate the pin 114 within the sleeve 112 after the concealable hanging device 110 is installed. Preferably, the proximal end 128 of the pin 114 is configured in the shape of either a slotted or Phillips head screw head. The tab-shaped distal end 116 of the pin 114 is configured to fit into and be received in the slot 118 in the inside diameter 120 of the sleeve 112. Thus, the pin 114 can be rotated so that the tab-shaped distal end 116 of the pin 114 can engage the slot 118, or can be prevented from engaging the slot 118. When the tab 116 is engaged with the slot 118, the pin 114 can be moved into an extended position. When the pin 114 is moved to a retracted position and the pin 114 is further rotated so that the tab 116 is out of alignment with and cannot engage the slot 118, the tab 116 contacts the distal end 122 of the sleeve 112 and thereby prevents the pin 114 from moving longitudinally, thus holding the pin 114 in a securely retracted position as shown in FIG. 3E. This securely retracted position is particularly useful for installation of the concealable hook 110 in a vertical orientation, so as to prevent gravity from pulling the pin 114 into an extended position when the concealable hanging device 110 is not in use and the pin 114 should be concealed from casual observation.

A fourth embodiment of the hanging device of the present invention is illustrated in FIGS. 4A-J. This fourth embodiment is applicable generally as discussed above, but also has special application in installations where the concealable hook is installed in drywall or gypsum board, either in the walls or ceiling of the interior of a building.

As illustrated in 4A-G, this drywall application concealable hook 200 is similar in configuration to the embodiments discussed above. However, it preferably includes a sleeve 212 configured to engage and hold in drywall or gypsum board. The outside of the sleeve 212 is configured much like a typical screw-type drywall anchor, sometimes called a drywall auger, with a slightly conical shape, tapering from the proximal end 214 to the distal end 216, and including one or more helical inclined planes 218 oriented longitudinally along the outside of the sleeve, with the one or more planes extending laterally from the outside of the sleeve 212. The proximal end 214 of the sleeve 212 may also include an annular lip 220 to assist in seating the sleeve in the drywall. Preferably, while the sleeve 212 may be deformable or expandable, the movement of the pin 222 does not contribute to the deformation or expansion of the sleeve 212 upon installation within the drywall. Instead, as with the other embodiments, the pin 222 should be freely movable, both longitudinally and rotatably, when the concealable hanging device 200 is installed, thereby limiting or preventing the pin 222 from performing the role of causing the sleeve 212 to deform or expand.

Preferably, this drywall application concealable hook also utilizes the vertical application embodiment slotted sleeve and tabbed pin head configuration of the above described embodiment, thereby allowing it to be advantageously used in drywall ceiling installations, where the force of gravity might otherwise cause the installed pin to move from a retracted to an extended position when not in use.

This drywall application concealable hook embodiment can also be used for hanging picture frames in indoor locations and may make mounting picture frames easier than using standard picture hanger hooks. This embodiment can also alleviate the problem of picture frames hung such that the top of the picture frame protrudes out from the wall at a slight angle, while the bottom of the picture frame is flush with the wall. The user can install the drywall concealable hanging device in drywall at a desired location and fully extend the pin. This full extension of the pin may make it easier for a user to align the mounting wire or bracket on the back of a picture frame than would otherwise be possible with a smaller, angled hook of a standard prior art picture hanger. Then, using the drywall application concealable hook, once the user has hung the picture frame, the user can push the frame, and by extension, the pin, toward the wall to make the frame flush with the wall.

This embodiment is meant to support light to medium weight objects.

A fifth embodiment of the hanging device of the present invention is illustrated in FIG. 5 and FIGS. 5A-L. This fifth embodiment is applicable generally as discussed above, but also has special application in installations where the concealable hook is installed in concrete, stucco, or metal, such as in the exterior walls of a building structure. Further, the metal application could include installation in the metal column of dining tables and bar tables commonly found in restaurants and bars.

As illustrated in FIG. 5 and FIGS. 5A-L, this concrete/stucco/metal application concealable hook 300 is similar in configuration to the embodiments discussed above. However, it preferably includes a sleeve 312 configured to engage and hold in a shield anchor 314, for use in concrete or stucco, or directly into metal. The outside of the sleeve 312 is configured as a typical bolt, or lag bolt, including one or more helical inclined planes, i.e., threads 316 oriented longitudinally along the outside of the sleeve 312, with the one or more planes extending laterally from the outside of the sleeve. The proximal end 317 of the sleeve 312 also preferably includes a head portion 318 which can be engaged by a tool to assist in installation of the concrete/stucco/sheet metal application concealable hook 300 by using the threaded sleeve 312. A hexagonal bolt head configuration is ideal, because it allows a user to use a wrench, socket wrench, or ratchet to assist the user in installing the concealable hanging device 300 into a threaded shield anchor 314 or directly into sheet metal. Other sleeve head configurations are of course possible, but not shown, and include, for example, a square four point bolt head, an octagonal eight point bolt head, a slotted screw head or a Phillips screw head. Such configurations may further include a countersink area within the head of the sleeve, allowing the pin, when in a retracted position, to be sunk below the level of the head, thereby allowing the head to be separately engaged by a screw driver without the screw driver engaging the pin head. Alternately, the pin head may be flush with the sleeve head, with the screw driver engageable slots extending across the head of the pin as well as the head of the sleeve.

As illustrated in FIGS. 5I-P, the bolt configuration of the sleeve of this embodiment 300 may operably engage a standard threaded shield anchor 314, or can be configured to engage any other known form of concrete or stucco anchor. This allows a user, who desires to install a concealable hanging device in a concrete or stucco wall, to install a standard inside-threaded shield anchor into the concrete or stucco at the desired location and then to use the threads 316 of the sleeve 312 to engage the shield anchor 314 and secure the device 300 in the wall.

Further, this embodiment could also be used for installation in wood, if the decoration to be hung is heavy and a particularly strong and robust concealable hook is needed for the decoration.

Figure 6C:
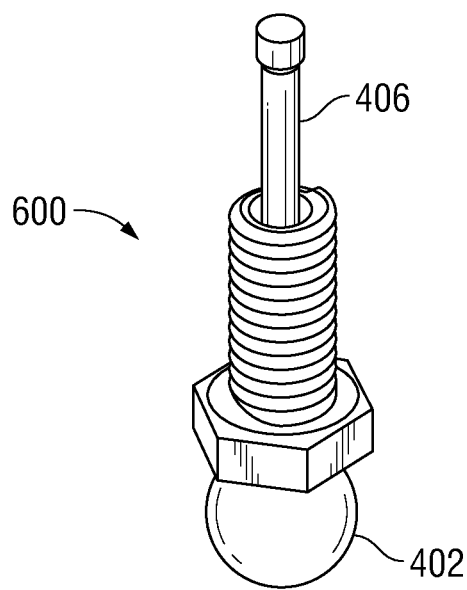
FIG. 6C is a side view of a sixth embodiment of the invention.
Figure 6C:
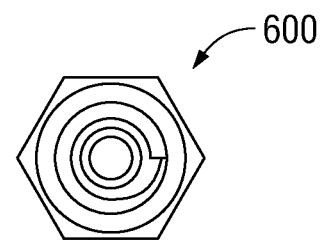
Figure 6C:
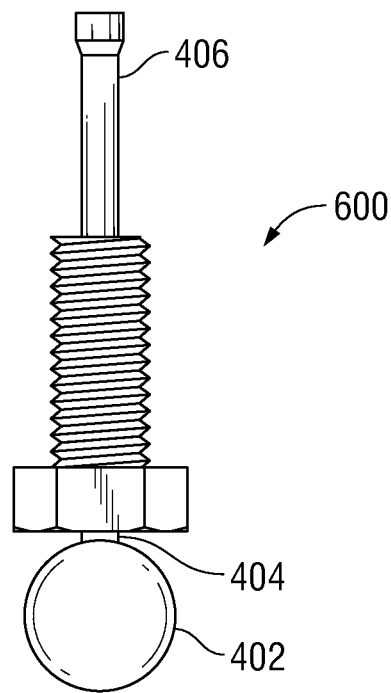
Figure 6D:
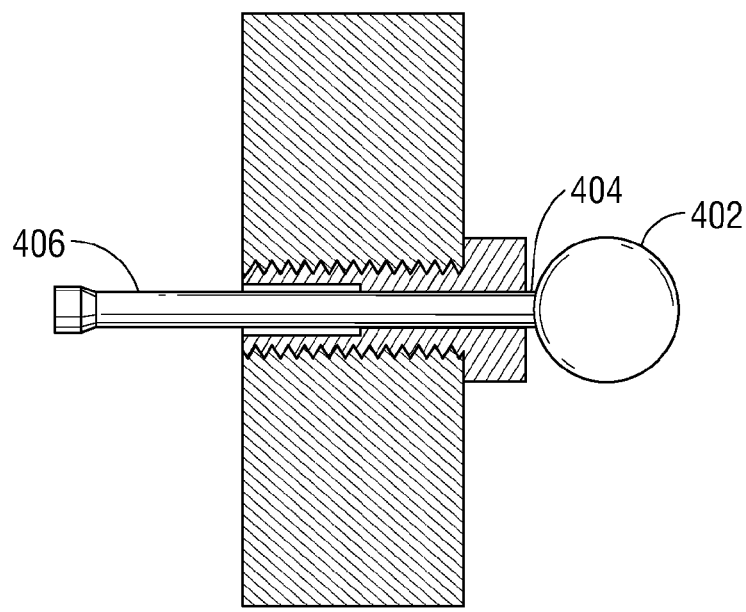
FIG. 6D is a side view cutaway drawing of the first embodiment of the invention, showing the device in place as installed and with the pin in a retracted position.
Figure 6E:
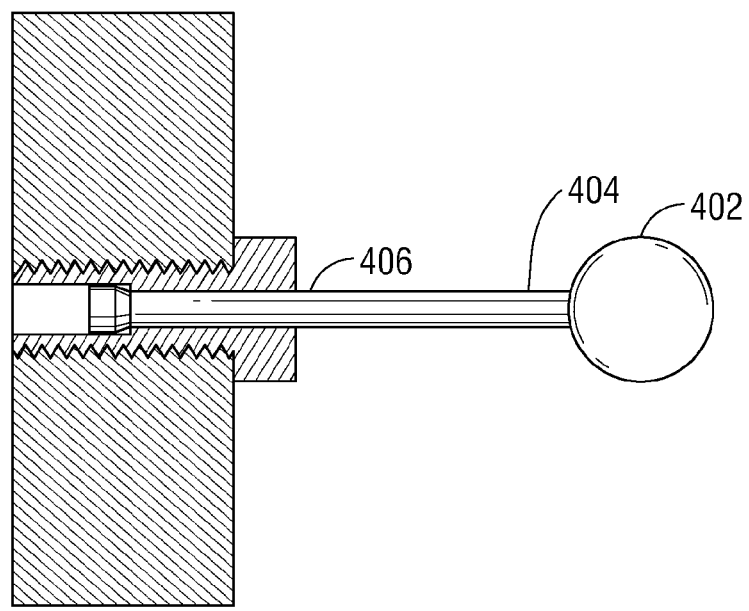
FIG. 6E is a side view cutaway drawing of the first embodiment of the invention, showing the device in place as installed and with the pin in an extended position.
Figure 6F:
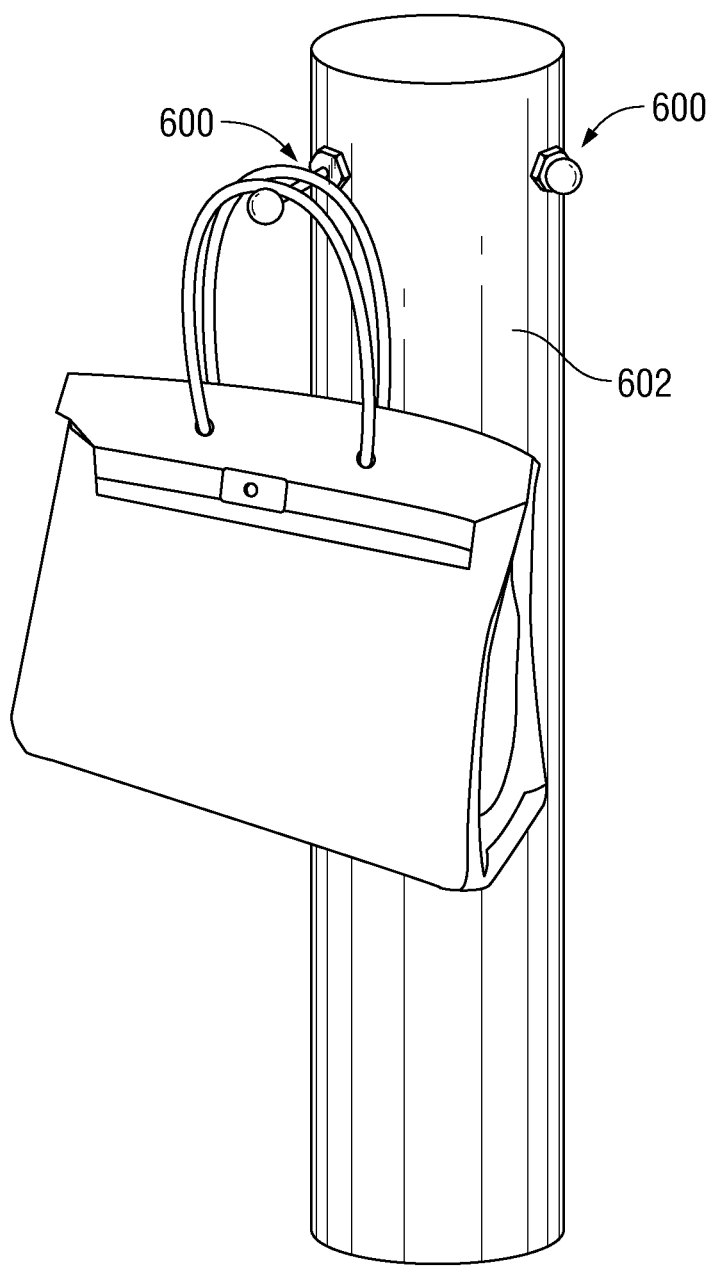
FIG. 6F illustrates two examples of the sixth embodiment of the invention in place as installed in the wood of the column of a bar table (top of table cut away), with the example on the left side in an extended position and supporting a purse, and the example on the right side in a retracted position, not in use.

Each of the above embodiments can also be installed in a home or restaurant environment and used for hanging outerwear or purses. As shown in FIGS. 6A-F, a purse hanger 600 embodiment of the invention can be used to conveniently and securely hang a purse in a restaurant or bar. Preferably, the purse hanger 600 is installed directly into walls or furniture in locations that are convenient for individuals to hang outerwear or purses and which are easily accessible or otherwise close at hand. Such locations include, for example, on the underside of a bar, on the side of a table, on a table leg, or a bar table central pillar 602, as shown in FIG. 6A. More preferably, as illustrated in FIG. 6, an ornamental knob 402 is attached to, or formed directly on, the proximal end 404 of the moveable pin 406. Preferably, the knob 402 has threads cut into back of the knob and the proximal end 404 of the moveable pin 406 is threaded. The knob 402 is then screwed onto the threaded proximal end 404 of the pin 406. This ornamental knob 402 can be, for example, a shape such as spherical, cubical, or ovoid. It may also be, sculptural, for example, in the shape of a lion's head, a flower or any other decorative shape desired by the user. Such an ornamental knob 402 can enhance and complement the décor of an interior. Such an ornamental knob can also serve as an easy point at which a user can grip the proximal end of the pin, so as to either extend or retract it. Further, because the ornamental knob 402 is attached to the threaded proximal end 404 of the pin 406, it can be conveniently swapped out with other ornamental versions of a knob, at the desire of the user and to minimize manufacturing costs.

Each of the above described embodiments can be used in accordance with the same general method of use. Naturally, the method of use of each embodiment will vary somewhat, depending upon the building structure application intended for each such embodiment. However, each is generally used as follows. First, a user drills or taps a hole in location where the concealable hanging device will be placed. Preferably, the hole is slightly smaller than the outer diameter of the sleeve. The hole is also preferably at least as deep as the length of either the pin when it is in a retracted position, or the sleeve, whichever is longer, depending upon the embodiment of the device being used. Second, the user hammers or screws the concealable hanging device into the hole, using for example, a hammer striking on the proximal end of the pin and sleeve, until the sleeve is sunk into the hole. The head of the sleeve is preferably flush with the surface of the building structure where it is installed, but it can also be countersunk if desired. Third, a user grips proximal end of pin and draws it back away from the proximal end of the sleeve, until the enlarged distal end of the pin contacts and engages the distal end of the sleeve, the annual shelf, or such other pin retention means as applicable to the embodiment used. This allows the proximal end of the pin to protrude and extends outward from the sleeve and away from the surface of the building structure. Fourth, the user can hang a decoration upon distal head end or exposed shaft of the pin. Finally, when the time comes to remove the holiday decoration, the decoration is detached from the pin and the head of the pin is depressed to move the pin back into a concealed retracted position. The installed concealable hanging device can then remain in this concealed retracted position until the next time that it is needed to hang a holiday decoration.

I claim:

1. A hanging device comprising:
a sleeve;
said sleeve having a length, a proximal end, a distal end, an inside diameter and an outside diameter;
a pin;
said pin having a proximal end and a distal end, and a length that is greater than the length of the sleeve;
the pin movably engaged in the sleeve;
the proximal end of the pin further comprising a head that has a diameter greater than the inside diameter of the sleeve;
the distal end of the pin further comprising a tip that is wider than the inside diameter of the sleeve, such that the tip cannot pass the distal end of the sleeve;
wherein the movably engaged pin is oriented such that the proximal end of the pin engages the proximal end of the sleeve and the tip of the pin engages the distal end of the sleeve;
wherein the moveably engaged pin can be repeatedly moved between an extended position and a retracted position within the sleeve;
the tip configured such that the tip engages the distal end of the sleeve to prevent the pin from being removable from the sleeve when the pin is moved to an extended position; and
the head configured such that the head engages the sleeve to allow the head to be grasped in order to allow the pin to be moved into the extended position.

2. The hanging device of claim 1 wherein the tip is a stopping means and such stopping means is not a threaded pin.

3. A hanging device comprising:
a sleeve;
said sleeve having a proximal end, a distal end, a first inside diameter, a second inside diameter, and an outside diameter;
wherein the first inside diameter of the sleeve is measurable at the proximal end of the sleeve;
wherein the second inside diameter of the sleeve is measurable at the distal end of the sleeve;
wherein the second inside diameter is greater than the first inside diameter, thereby defining an annular shelf oriented laterally within the sleeve;
a pin;
said pin having a proximal end and a distal end;
the pin movably engaged in the sleeve;
the proximal end of the pin further comprising a head that has a diameter larger than the first inside diameter of the sleeve;
the distal end of the pin further comprising a tip that is wider than the first inside diameter of the sleeve and smaller than the second inside diameter of the sleeve, such that the tip cannot pass the annular shelf;
wherein the movably engaged pin is oriented such that the proximal end of the pin engages the proximal end of the sleeve and the distal end of the pin is generally in the proximity of the distal end of the sleeve;
wherein the pin can be repeatedly moved between an extended position and a retracted position within the sleeve;
wherein the tip is configured such that the tip engages the annular shelf to prevent the pin from being removable from the sleeve when the pin is moved to an extended position;
the head configured such that the head engages the sleeve to allow the head to be grasped in order to allow the pin to be moved into the extended position.

* * * * *